United States Patent
Lee et al.

(10) Patent No.: US 7,636,571 B2
(45) Date of Patent: Dec. 22, 2009

(54) METHOD AND APPARATUS FOR ALLOCATING CHANNELS IN AN ORTHOGONAL FREQUENCY DIVISION MULTIPLE ACCESS SYSTEM

(75) Inventors: Jae-Hyok Lee, Seoul (KR); Jae-Ho Jeon, Seongnam-si (KR); Soon-Young Yoon, Seoul (KR); Seung-Joo Maeng, Seongnam-si (KR); Jeong-Tae Oh, Yongin-si (KR); Ji-Ho Jang, Seoul (KR)

(73) Assignee: Samsung Electronics Co., Ltd (KR)

( * ) Notice: Subject to any disclaimer, the term of this patent is extended or adjusted under 35 U.S.C. 154(b) by 43 days.

(21) Appl. No.: 11/072,181

(22) Filed: Mar. 4, 2005

(65) Prior Publication Data

US 2005/0197132 A1 Sep. 8, 2005

(30) Foreign Application Priority Data

Mar. 5, 2004 (KR) .................. 10-2004-0015218

(51) Int. Cl.
*H04W 36/00* (2006.01)
*H04W 72/00* (2006.01)
*H04W 40/00* (2006.01)
(52) U.S. Cl. .................. 455/437; 455/450; 455/447
(58) Field of Classification Search ............. 455/450, 455/436, 446, 447, 442, 438
See application file for complete search history.

(56) References Cited

U.S. PATENT DOCUMENTS

| | | | | |
|---|---|---|---|---|
| 5,267,261 A | * | 11/1993 | Blakeney et al. | ............ 370/332 |
| 5,487,083 A | * | 1/1996 | Nakajima et al. | ............ 375/142 |
| 6,507,567 B1 | * | 1/2003 | Willars | ............ 370/321 |
| 6,683,862 B1 | | 1/2004 | Kim et al. | |
| 6,690,936 B1 | * | 2/2004 | Lundh | ............ 455/436 |
| 6,836,661 B2 | * | 12/2004 | Mohebbi | ............ 455/437 |

(Continued)

FOREIGN PATENT DOCUMENTS

CN 1957625 10/2004

(Continued)

OTHER PUBLICATIONS

Hyunjeong Kang et al., "Safety Channel Handover Procedure" IEEE 802.16 Broadband Wireless Access Working Group, Jun. 25, 2004.

*Primary Examiner*—George Eng
*Assistant Examiner*—Christopher M Brandt
(74) *Attorney, Agent, or Firm*—The Farrell Law Firm, LLP

(57) ABSTRACT

A method for allocating a frequency to a subscriber station (SS) in handover operation in an Orthogonal Frequency Division Multiple Access (OFDMA) system. In the method, the SS checks safety channel frequencies for a target base station (BS), generates a safety channel frequency request message for requesting allocation of the checked safety channel frequencies, and transmits the safety channel frequency request message. Upon receiving the safety channel frequency request message from the SS, a serving BS allocates frequencies for a requested channel, and transmits an allocation message with the frequency allocation information to the SS. The serving BS transmits a channel allocation request message to the target BS according to the frequency allocation information. Upon receiving the channel allocation request message, the target BS allocates the safety channel frequencies to the SS.

4 Claims, 14 Drawing Sheets

U.S. PATENT DOCUMENTS

| | | | |
|---|---|---|---|
| 6,879,830 B1* | 4/2005 | Vollmer et al. | 455/442 |
| 6,885,866 B1* | 4/2005 | Wikstedt et al. | 455/436 |
| 7,047,009 B2* | 5/2006 | Laroia et al. | 455/437 |
| 7,072,315 B1* | 7/2006 | Liu et al. | 370/329 |
| 2001/0026543 A1* | 10/2001 | Hwang et al. | 370/335 |
| 2001/0046217 A1* | 11/2001 | Kim | 370/331 |
| 2002/0077104 A1* | 6/2002 | Chen et al. | 455/436 |
| 2002/0128014 A1 | 9/2002 | Chen | |
| 2002/0142771 A1* | 10/2002 | Saifullah et al. | 455/436 |
| 2003/0013451 A1* | 1/2003 | Walton | 455/447 |
| 2003/0179731 A1* | 9/2003 | Noguchi et al. | 370/331 |
| 2004/0053615 A1* | 3/2004 | Kim et al. | 455/436 |
| 2004/0190482 A1* | 9/2004 | Baum et al. | 370/347 |
| 2004/0229615 A1* | 11/2004 | Agrawal | 455/436 |
| 2005/0096062 A1* | 5/2005 | Ji et al. | 455/450 |
| 2006/0052108 A1* | 3/2006 | Laroia et al. | 455/436 |

FOREIGN PATENT DOCUMENTS

| | | |
|---|---|---|
| JP | 10-336720 | 12/1998 |
| JP | 2003-018640 | 1/2003 |
| KR | 1020000034866 | 6/2000 |
| KR | 1020000060118 | 10/2000 |
| WO | WO 2005/062633 | 7/2005 |

\* cited by examiner

METHOD AND APPARATUS FOR ALLOCATING CHANNELS IN AN ORTHOGONAL FREQUENCY DIVISION MULTIPLE ACCESS SYSTEM

PRIORITY

This application claims priority under 35 U.S.C. § 119 to an application entitled "Method and Apparatus for Allocating Channels in an Orthogonal Frequency Division Multiple Access System" filed in the Korean Intellectual Property Office on Mar. 5, 2004 and assigned Serial No. 2004-15218, the contents of which are incorporated herein by reference.

BACKGROUND OF THE INVENTION

1. Field of the Invention

The present invention relates generally to a method and apparatus for allocating channels in a wireless communication system, and in particular, to a method and apparatus for allocating channels in an Orthogonal Frequency Division Multiple Access (OFDMA) system.

2. Description of the Related Art

Wireless communication systems have been developed to make up for shortcomings of wired communication systems in which subscriber stations cannot access fixed wired networks. With the progress of communication technology, the wireless communication systems have evolved into mobile communication systems. A cellular system is a typical mobile communication system. The cellular system refers to a system for connecting a base station to a subscriber station through a wireless channel to a wired network. A cellular mobile communication system using a Code Division Multiple Access (CDMA) scheme (hereinafter referred to as a "CDMA cellular mobile communication system") is a typical cellular system.

Although the cellular systems were originally developed to provide voice communication services, cellular systems capable of providing various data services have recently appeared. In addition, as the amount of data required by each cellular system user increases, so does the demand to transmit this data at higher speed. Therefore, ongoing research into a CDMA cellular system capable of meeting these demands is being made.

Also, research into an OFDMA system (different from the CDMA system) is being made to provide users with the desired data at high speed. In addition, commercialization of the OFDMA system is now being discussed.

A detailed description will now be made of the OFDMA system. The OFDMA scheme identifies users using orthogonal frequencies in transmitting data to the users. The OFDMA scheme is superior to the CDMA scheme in terms of a data rate. However, the use of the OFDMA scheme inevitably increases a frequency reuse factor.

With reference to FIG. 1, a description will be now made of frequency reuse. FIG. 1 is a conceptual diagram for a description of frequency reuse in an OFDMA cellular system. A frequency reuse factor is 3, by way of example. Available orthogonal frequencies are represented by carrier indexes. A "carrier index" refers to a set of orthogonal frequencies with which users can be identified. Not all of the orthogonal frequencies can be used in a particular base station because orthogonal frequencies used in a first base station cannot be used in a neighbor region of the base station, as doing so can disable data communication due to interference between two similar frequencies.

In order to solve this problem, it is necessary to allocate different frequencies to base stations so that the same frequency should not be used in a neighbor region of a particular base station. As illustrated in FIG. 1, assuming that reference numeral 100 denotes a base station located in the center, all of neighbor base stations 110, 120, 130, 140, 150 and 160 have different carrier indexes. That is, the respective base stations use frequencies in such a manner so that no interference can occur between the frequencies. More specifically, $n_1$ represents a set of carrier indexes for ⅓ of all orthogonal frequencies. Base stations using orthogonal frequencies with the carrier indexes included in the carrier index set $n_1$ are denoted by reference numerals 110, 130 and 150. Similarly, $n_2$ represents a set of carrier indexes for another ⅓ of all orthogonal frequencies. A base station using orthogonal frequencies with the carrier indexes included in the carrier index set $n_2$ corresponds to a base station 100 located in the center. Finally, $n_3$ represents a set of carrier indexes for another ⅓ of all orthogonal frequencies. Base stations using orthogonal frequencies corresponding to the carrier indexes included in the carrier index set $n_3$ are denoted by reference numerals 120, 140 and 160. For such a hexagonal cellular system, a frequency reuse factor is 3. This means that every 3 base stations can use the same frequency. In other words, it means that frequencies available in one base station become ⅓ of all available frequencies. It is assumed that each base station in FIG. 1 has an ideal hexagonal cell. However, in an actual cellular system, each base station cannot have an ideal hexagonal cell, thereby necessitating an increase in number of neighbor base stations. Therefore, the frequency reuse factor may be larger than 3 in actual use.

The increase in frequency reuse factor results in a reduction of frequency resources available in an OFDMA cellular system, thus decreasing user capacity.

Currently, however, a system capable of using a frequency reuse factor of 1 or a system capable of using a frequency reuse factor approximating 1 is being considered for an OFDMA cellular system. In this case, it is not possible to support handover from a particular base station to another base station for the following reason. In the case where a frequency reuse factor of 1 or a frequency reuse factor approximating 1 is used, if a subscriber station moves from a particular base station to another base station, the subscriber station should use both a frequency resource used in the old base station and a frequency resource allocated in the new base station, causing a considerable increase in interference between the frequency resources.

More specifically, a subscriber station in handover operation is allocated a particular orthogonal frequency resource for communication with its old base station (hereinafter referred to as a "serving base station") and is performing communication with the serving base station. Herein, the term "handover situation" refers to a situation in which a subscriber station is moving from a serving base station to a new base station (hereinafter referred to as a "target base station"). In this case, the target base station might have already allocated the same frequency resource to another subscriber station. At this point, the subscriber station in handover operation and another subscriber station located in the target base station use the same frequency resource, causing a considerable interference. In this case, both of the two subscriber stations cannot perform communication.

SUMMARY OF THE INVENTION

It is, therefore, an object of the present invention to provide a method and apparatus for removing inter-frequency interference during handover in an OFDMA system using a frequency reuse factor of 1 or a frequency reuse factor approximating 1.

It is another object of the present invention to provide a method and apparatus for performing stable handover in an OFDMA system using a frequency reuse factor of 1 or a frequency reuse factor approximating 1.

According to one aspect of the present invention, there is provided a method for allocating a frequency to a subscriber station (SS) in handover operation in an Orthogonal Frequency Division Multiple Access (OFDMA) system. In the method, the SS checks safety channel frequencies for a target base station (BS), generates a safety channel frequency request message for requesting allocation of the checked safety channel frequencies, and transmits the safety channel frequency request message. Upon receiving the safety channel frequency request message from the SS, a serving BS allocates frequencies for a requested channel, and transmits an allocation message with the frequency allocation information to the SS. The serving BS transmits a channel allocation request message to the target BS according to the frequency allocation information. Upon receiving the channel allocation request message, the target BS allocates the safety channel frequencies to the SS.

According to another aspect of the present invention, there is provided a subscriber station (SS) apparatus for performing handover in a system including a serving base station (BS) in communication with the SS, and a target BS during handover of the SS, the BSs using an Orthogonal Frequency Division Multiple Access (OFDMA) scheme, the system allocating a predetermined number of frequencies among orthogonal frequencies as safety channel frequencies. The SS apparatus includes a signal-to-noise ratio (SNR) measurer for measuring SNRs of signals received from the serving BS and the target BS; a controller for determining a need of handover and safety channel frequencies for the target BS depending on the SNRs measured by the SNR measurer, and generating a channel allocation request message for requesting allocating of safety channels for the target BS in a next frame when the handover is needed; a data transmission processor for encoding and modulating the channel allocation request message generated by the controller; and a radio frequency (RF) unit for transmitting an output signal of the data transmission processor using the OFDMA scheme.

According to one aspect of the present invention, there is provided a system for providing handover of a subscriber station (SS), the system including a serving base station (BS) in communication with the SS, and a target BS during handover of the SS, the BSs using an Orthogonal Frequency Division Multiple Access (OFDMA) scheme. In the system, the SS checks safety channel frequencies for the target BS during handover, generates a safety channel frequency request message for requesting allocation of the checked safety channel frequencies, transmits the safety channel frequency request message to the serving BS, and upon receiving a channel allocation message from the serving BS, performs handover using a channel allocated in the channel allocation message from a next frame. Upon receiving the safety channel frequency request message from the SS, the serving BS generates a channel allocation request message for requesting the target BS to allocate a safety channel to the SS, transmits the channel allocation request message to the target BS, and upon receiving a channel allocation response message from the target BS, determines frequencies to be allocated to the SS according to the received message, allocates the determined frequencies to the SS, generates channel allocation information using the allocated frequencies, and transmits the channel allocation information to the SS. Upon receiving the channel allocation request message from the serving BS, the target BS determines whether the requested channel is allocable, generates a channel allocation response message using the determination result, transmits the channel allocation response message to the serving BS, and if the requested channel is allocable, allocates the requested channel to the SS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
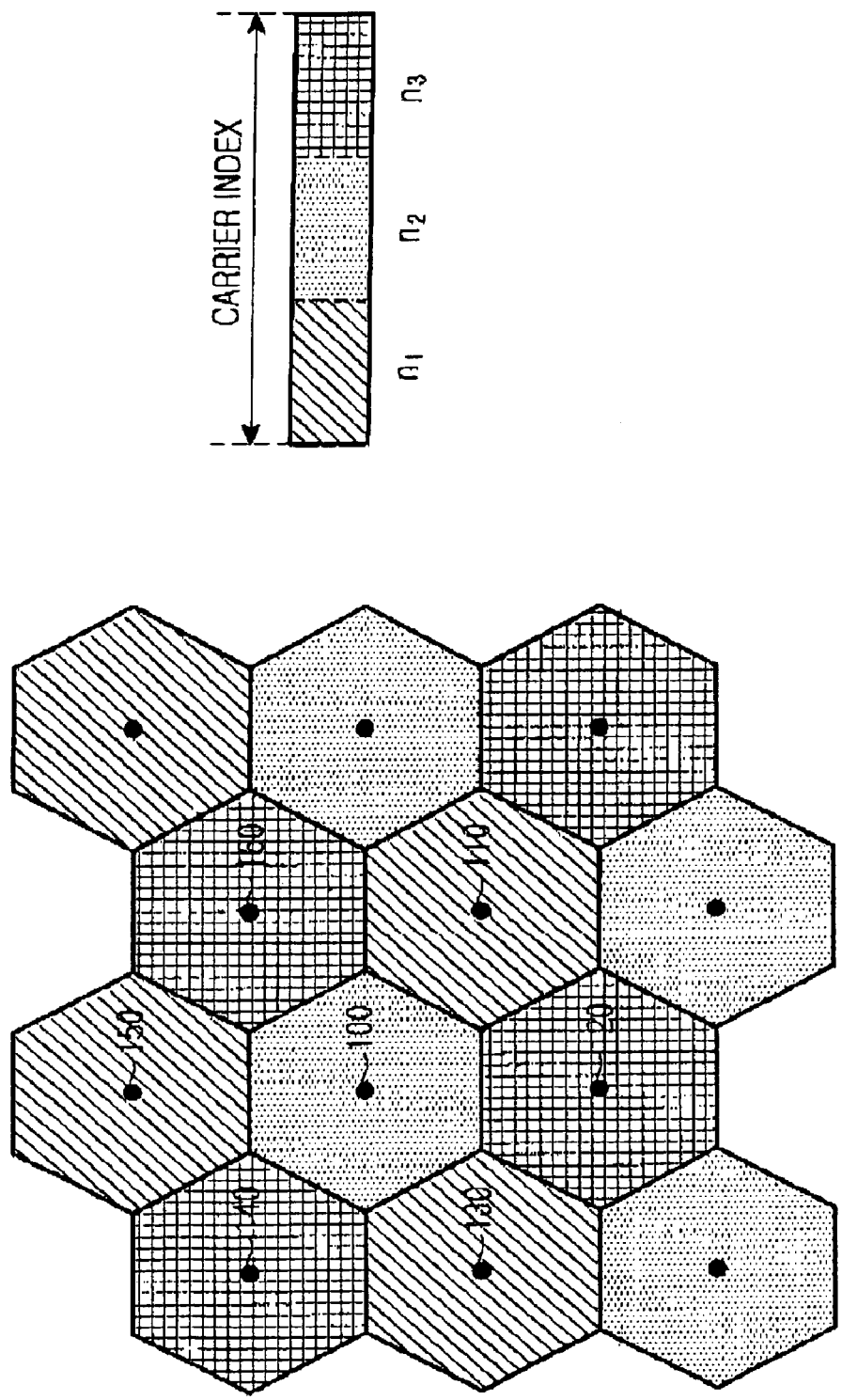
FIG. 1 is a conceptual diagram for a description of frequency reuse in an OFDMA cellular system.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
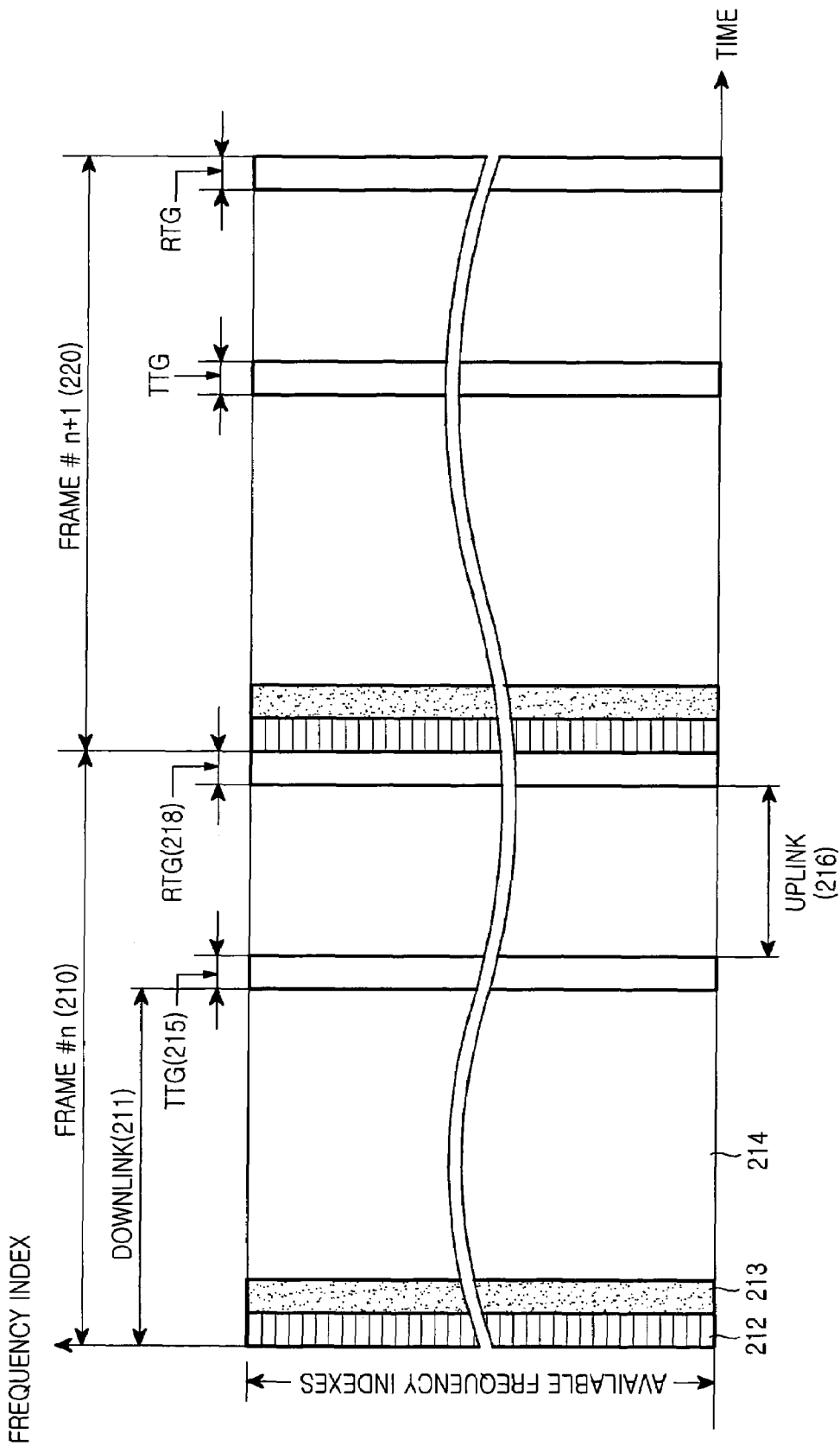
FIG. 2 is a diagram illustrating a frame structure of an OFDMA system employing a frequency reuse factor of 1.

FIG. 2 is a diagram illustrating a frame structure of an OFDMA system employing a frequency reuse factor of 1. With reference to FIG. 2, a description will now be made of a frame structure of an OFDMA system desiring to use a frequency reuse factor of 1.

A vertical axis denotes indexes of available orthogonal frequencies and a horizontal axis denotes time. An $n^{th}$ frame 210 and an $(n+1)^{th}$ frame 220 have the same structure, and for simplicity, only the $n^{th}$ frame 210 will be described herein. The $n^{th}$ frame 210 is roughly divided into a frame transmission interval for a downlink 211 and a frame transmission interval for an uplink 216. Here, the term "downlink" refers to a link set up from a base station to a subscriber station, and the term "uplink" refers to a link set up from a subscriber station to a base station. The $n^{th}$ frame 210 has a Tx/Rx Transition Gap (TTG) 215 for distinguishing the frame transmission interval for the downlink 211 from the frame transmission interval for the uplink 216. Further, the $n^{th}$ frame 210 has an Rx/Tx Transition Gap (RTG) 218 for distinguishing between frames, and also distinguishing the frame transmission interval for the uplink 216 from the frame transmission interval 214 for the downlink 211. The downlink 211 has a transmission interval 212 for a first preamble and a transmission interval 213 for a second preamble, at the head thereof. After the lapse of time of the two intervals 212 and 213, a base station transmits data to a particular subscriber station (or subscriber stations). The uplink 216 is an interval for which a subscriber station or subscriber stations transmit data to a base station. The data transmission interval for the uplink 216 can have, at the head thereof in a time domain, an interval for performing a ranging process necessary for handover or initial access of a subscriber station, and transmitting an acknowledgement (ACK) for a received frame. Although such an interval can be located in any position of the data transmission interval for the uplink 216, it is preferable that the corresponding interval is located at the head of the data transmission interval for the uplink 216.

In the current OFDMA system desiring to use a frequency reuse factor of 1 or a frequency reuse factor approximating 1, data transmission/reception is repeatedly achieved using the foregoing frame structure. However, if the data transmission is performed in the foregoing manner, the data transmission can be failed due to interference between the same frequencies during handover as described in the Related Art section. Therefore, the present invention proposes a scheme for enabling seamless data transmission even during handover in a way of allocating a channel using a frequency reuse factor approximating 1 instead of using a frequency reuse factor of 1.

The present invention allocates a safety channel frequency to minimize interference between a subscriber station in handover operation and another subscriber station located in an area served by a target base station. The present invention can be divided into two embodiments according to the method of allocating a safety channel frequency.

A first embodiment provides a method in which a base station varies a safety channel frequency with time every frame or (predetermined number of frames) except during a handover as will be described below. For example, while a subscriber station in handover operation moves to a target base station (i.e., while handover to a target base station is being achieved), a safety channel frequency is fixed. For the other intervals, the safety channel frequency is continuously varied.

A second embodiment provides a method in which a base station fixedly uses a safety channel frequency unless the base station uses the same safety channel frequency as a neighbor base station does. Because the base station fixedly uses a safety channel frequency in this manner, a subscriber station in handover operation can continuously communicate with the base station while moving to a target base station, and prevent interference to other users of the target base station. In addition, when there is an equal part in frequency resources used as safety channels between two base stations, it is possible to prevent the use of the same safety channel frequency by using a background signaling method, for example, a No. 7 signaling method. Even in this case, the second embodiment is equal to the first embodiment in terms of operation. With reference to the accompanying drawings, a detailed description will now be made of the first and second embodiments of the present invention.

Figure 3A:
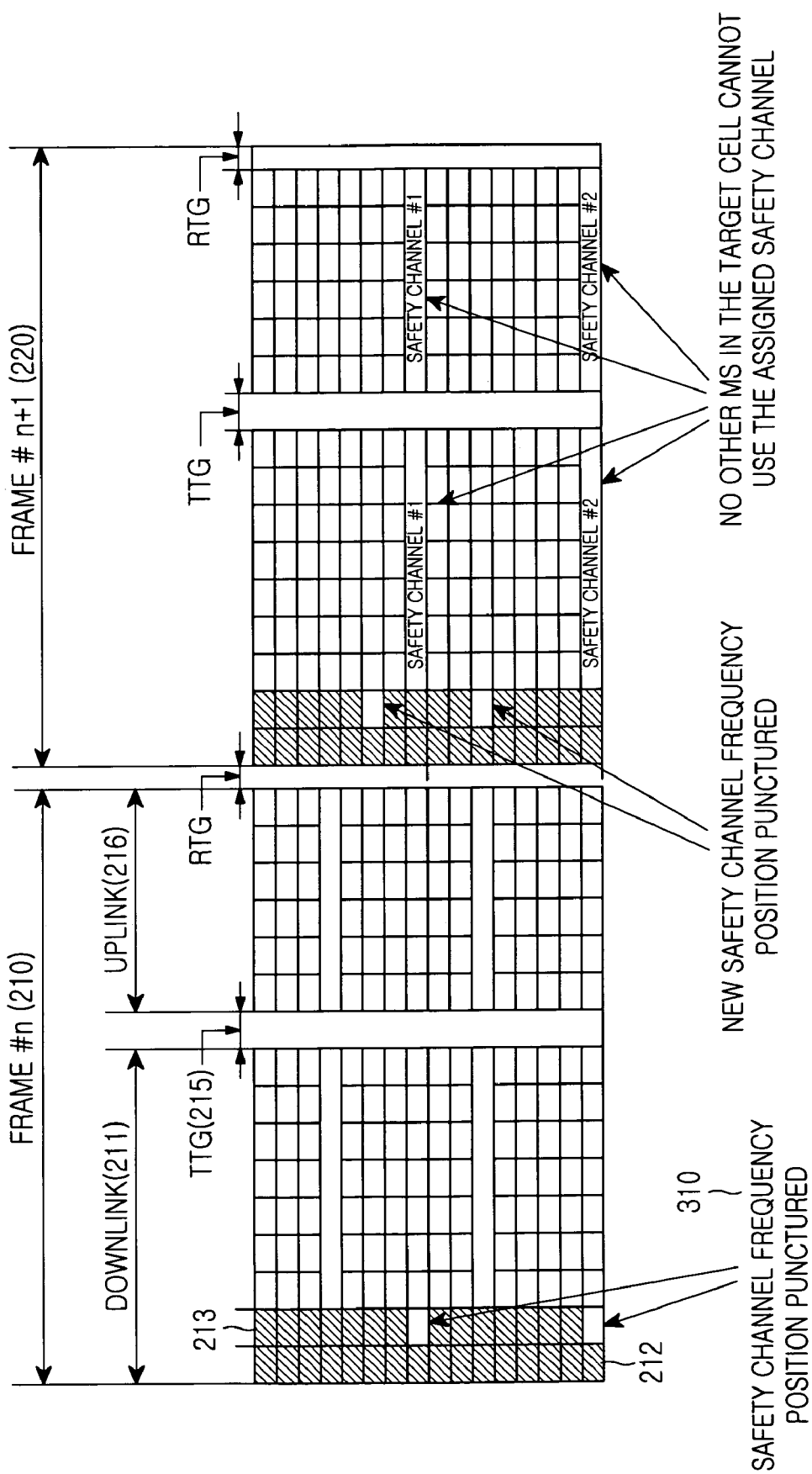
FIG. 3A is a diagram illustrating a frame structure in an OFDMA system according to a first embodiment of the present invention.

FIG. 3A is a diagram illustrating a frame structure in an OFDMA system according to the first embodiment of the present invention. With reference to FIG. 3A, a description will now be made of a frame structure in an OFDMA system according to the first embodiment of the present invention. The same elements in FIGS. 2 and 3A are denoted by the same reference numerals, and therefore, a detailed description thereof will be omitted.

The first embodiment of the present invention proposes a method of proving redundant safety channel frequencies. According to the first embodiment of the present invention, a safety channel frequency of each base station has a different pattern which varies every frame or (predetermined number of frames) except handover (as will be described below). A subscriber station communicates with a base station until handover is completed through such a safety channel frequency, and a description thereof will be made below.

As described with reference to FIG. 2, a frame transmission interval for a downlink 211 has a transmission interval 212 for a first preamble, at the head thereof. After the transmission interval 212 for the first preamble, a transmission interval 213 for a second preamble is located. In the present invention, the frame is created such that a safety channel frequency can be sent in the transmission interval 213 for the second preamble. That is, while the first preamble is used for its original purpose in which a subscriber station measures a distance from a base station and a state of a channel to the base station and then reports the measurement results to the base station, the second preamble is used for detecting a safety channel frequency resource of a neighbor base station according to an embodiment of the present invention. Therefore, data to be transmitted with frequencies 310 to be allocated as safety channel frequencies according to the first embodiment of the present invention are punctured so that the data should not be actually transmitted in the transmission interval 213 for the second preamble. That is, in the next frame, only the data to be transmitted with the frequencies 310 to be allocated as the safety channel frequencies are punctured for transmission interrupt, and data to be transmitted with the remaining frequency resources is actually transmitted in the transmission interval 213 for the second preamble. In this manner, the parts where data is not transmitted in the transmission interval 213 for the second preamble become frequency resources to be allocated as safety channel frequencies in a predetermined number of next frames, for example, the next frame 220 shown in FIG. 3A.

In this method, a base station previously informs subscriber stations of redundant frequency resources left to be used for handover, which are not used in a predetermined number of next frames. Then the subscriber stations can determine safety channel frequencies unused in the predetermined number of next frames.

Figure 3B:
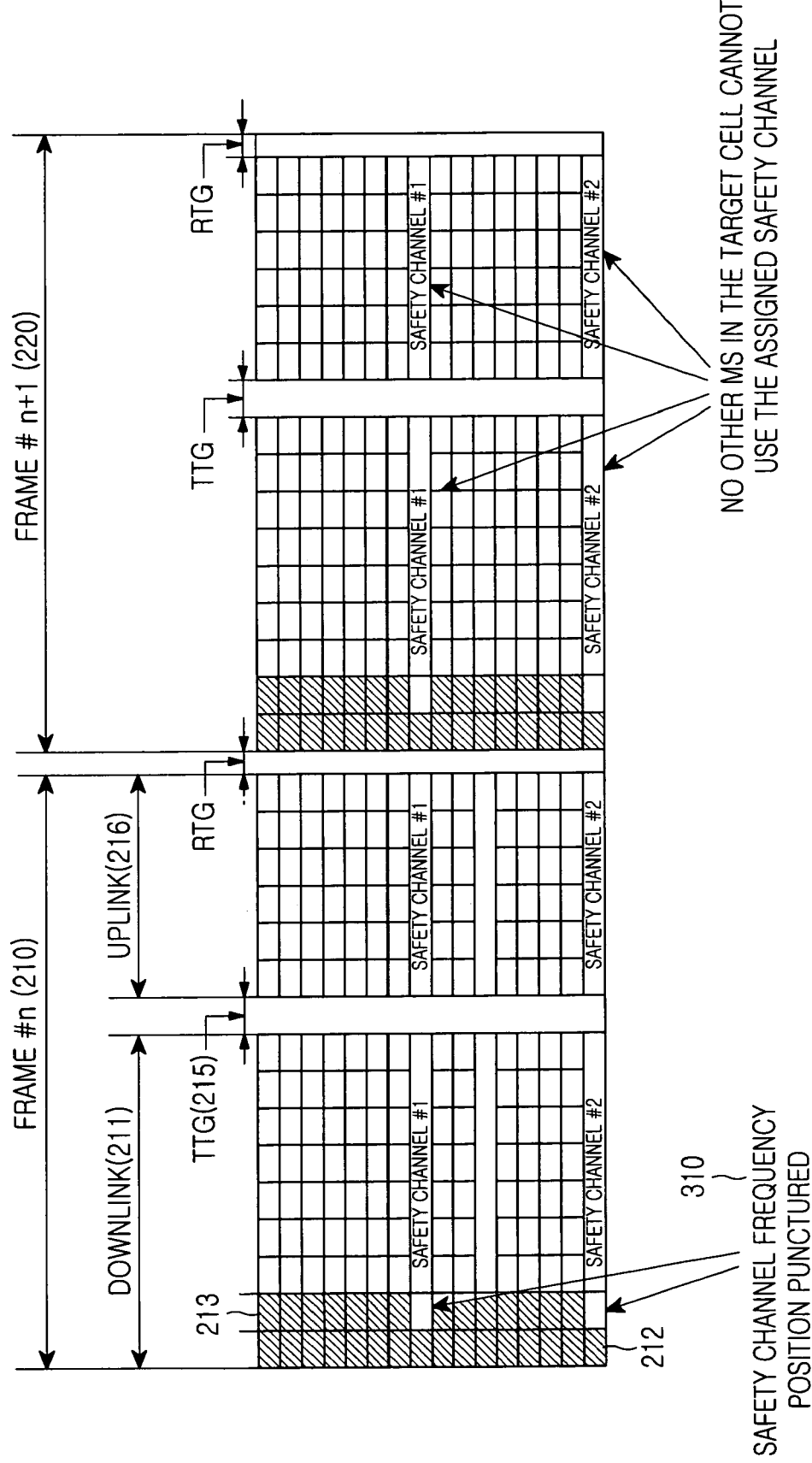
FIG. 3B is a diagram illustrating a frame structure in an OFDMA system according to a second embodiment of the present invention.

Next, the second embodiment of the present invention will be described. FIG. 3B is a diagram illustrating a frame structure in an OFDMA system according to the second embodiment of the present invention. A description will now be made of a frame structure in an OFDMA system according to the second embodiment of the present invention. The same elements in FIGS. 2 and 3B are denoted by the same reference numerals, and therefore a detailed description thereof will be omitted.

In the second embodiment of the present invention, a base station continuously uses the same safety channel frequency resource unless it allocates the same safety channel frequency resource as that which are used by a neighbor base station. Therefore, FIG. 3 shows a frame structure in which the same frequency resources are maintained. That is, the same safety channel frequency resources are allocated in both an $n^{th}$ frame 210 and an $(n+1)^{th}$ frame 220. Because the same allocation is maintained even in the next frame, the base station and the subscriber stations can simply acquire safety channel information in the next frame.

Base stations may be equal to each other or different from each other in terms of the number of the safety channel frequencies, or safety channels. In the present invention, the number of the safety channels is not particularly limited.

A detailed description will now be made of occurrence of a subscriber station's handover in an OFDMA system having the safety channel frequency resources through the frame structures of FIGS. 3A and 3B.

Figure 4A:
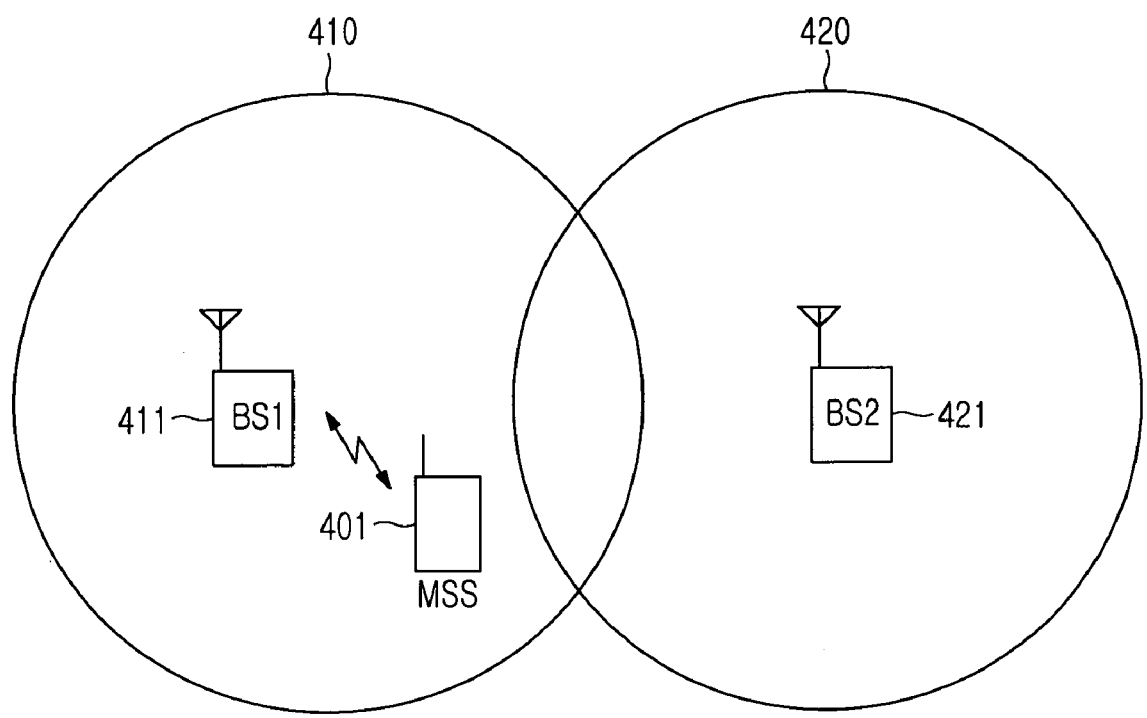
FIGS. 4A to 4E are conceptual diagrams for a description of an operation performed when a subscriber station performs handover using a safety channel frequency in an OFDMA system according to an embodiment of the present invention.
Figure 4B:
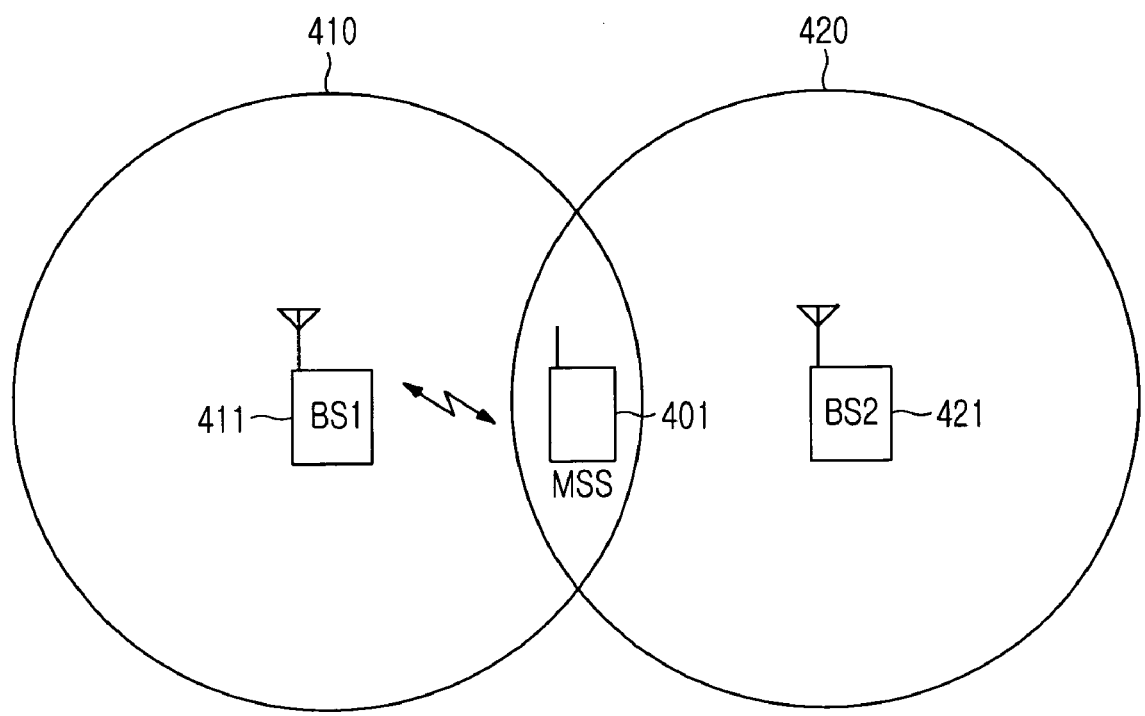
Figure 4C:
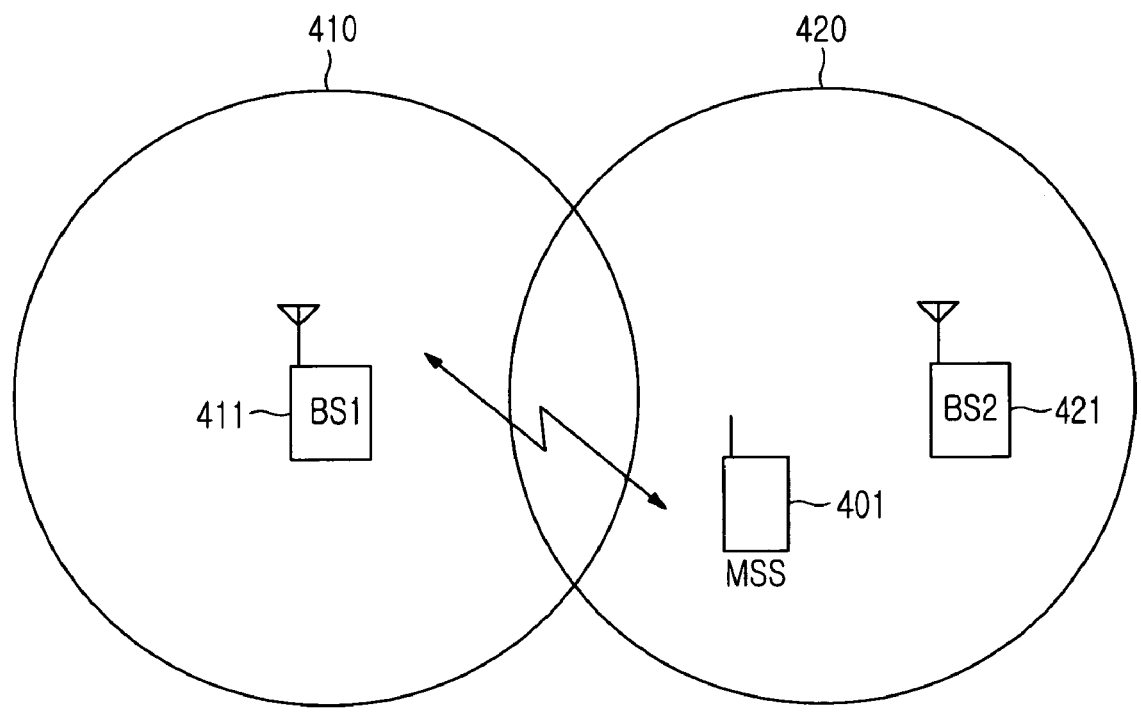

FIGS. 4A to 4C are conceptual diagrams for a description of an operation performed when a subscriber station performs handover using a safety channel frequency in an OFDMA system according to an embodiment of the present invention. With reference to FIGS. 4A to 4C, a detailed description will now be made of an operation performed when a subscriber station performs handover using a safety channel frequency in an OFDMA system according to an embodiment of the present invention. Base stations illustrated in FIGS. 4A to 4C are directly connected to each other by wire or indirectly connected to each other via another system.

A first base station (BS1) 411 is a base station that performs OFDMA communication with a mobile subscriber station (MSS) 401. Coverage of the BS1 411 is denoted by reference numeral 410. In the coverage 410 of the BS1 411, the MSS 401 performs communication using the frame structure described with reference to FIG. 3A or 3B. A second base station (BS2) 421, which is a neighbor BS of the BS1 411, is denoted by reference numeral 420. The MSS 401 can move to a boundary of the BS1 411 while performing data transmission/reception through an uplink and a downlink. If the MSS 401 continues to move to the boundary of the BS1 411 (i.e., if the MSS 401 moves to a region where it can communicate with both the BS1 411 and the BS2 421 as illustrated in FIG. 4B), the MSS 401 recognizes that a handover may be required. The MSS 401 can recognize that a handover may be required by checking a first preamble region or by checking a level of a received pilot signal. The MSS 401 recognizes the necessity of handover when a signal-to-noise ratio (SNR) of a first preamble or a pilot signal received from the BS1 411 becomes lower than a predetermined threshold, and/or a high-level signal is received from the neighbor BS (i.e., the BS2 421).

In this case, the MSS 401 determines safety channel frequencies in the next frame in the BS2 421 using a signal received from the BS1 411 and a signal received from the BS2 421. The MSS 401 reports the safety channel frequencies determined in the BS2 421, to be used in the next frame, to the BS1 411. Then the BS1 411 defines the safety channel frequencies of the BS2 421, reported by the MSS 401, as channel frequencies to be allocated to the MSS 401 in the next frame. After this process, the first embodiment and the second embodiment perform different operations. First, an operation of the first embodiment will be described below.

In the first embodiment, the BS1 411 reports to the BS2 421 that the MSS 401 will use the safety channel frequencies during handover. Then the BS2 421 fixes the safety channel frequencies of the BS1 411 so that the MSS 401 uses the safety channel frequencies for communication with a serving BS (e.g., BS1). That is, the BS2 421 fixes the safety channel frequencies so that the MSS 401 can fixedly use the safety channel frequencies until its handover is completed. After completion of the handover, the BS2 421 changes the safety channel frequencies every frame. Therefore, when the handover is completed, the BS1 411 should inform the BS2 421 of the completion of handover. Next, an operation of the second embodiment will be described below.

In the second embodiment, because the same safety channel frequency resources are continuously allocated, the BS1 411 is not required to transmit a report message to the BS2 421. Therefore, the BS1 411 allocates the reported frequencies to the MSS 401 in handover operation and continuously performs its communication during handover. After the handover is completed, the BS1 411 is not required to transmit a report message to the BS2 421.

As described above, the MSS 401, which was allocated the safety channel frequency resources in the next frame due to the handover situation, performs communication using the channel resources allocated from the BS1 411 until the handover is completed. Therefore, before the handover is completed, even though the MSS 401 moves in the coverage 420 of the BS2 421, it continues to communicate with the BS1 411 as illustrated in FIG. 4C.

After the foregoing operation, the MSS 401 may encounter the following 3 cases. In a first case, the MSS 401 completely moves to the target BS (i.e., the BS2 421), after completion of the handover. In a second case, the MSS 401 moves back to the coverage 410 of the serving BS (i.e., the BS1 411), in course of performing the handover. In a third case, the MSS 401 cuts off its call in the course of performing the handover.

Figure 4D:
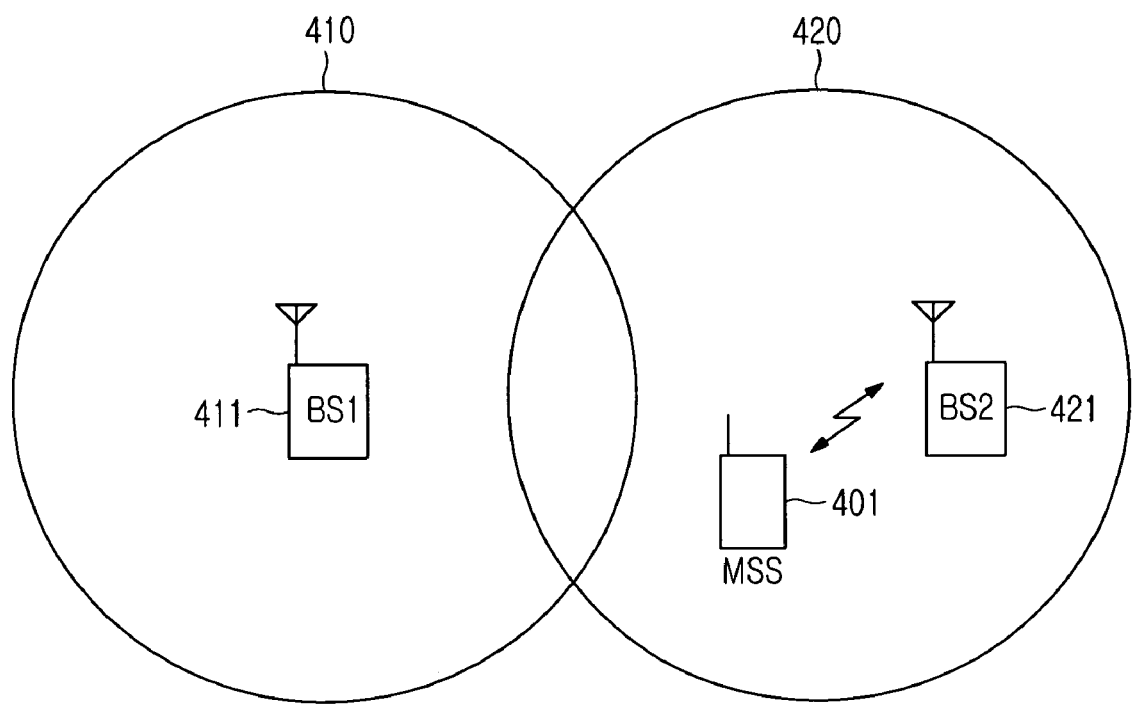

A description will now be made of each of the foregoing 3 cases. First, a description of the first case will be made below. When the MSS 401 completely moves to the coverage 420 of the target BS (i.e., the BS2 421), the MSS 401 releases the call to the BS1 411 and sets up a channel to the BS2 421 for communication therewith. The first embodiment and the second embodiment are equal to each other in terms of the foregoing operation. That is, a state transition happens to a normal state in which the MSS 401 communicates with only the BS2 421 as illustrated in FIG. 4D. In this state, the MSS 401 performs communication using other normal channels instead of the safety channels set up by the BS2 421.

Figure 4E:
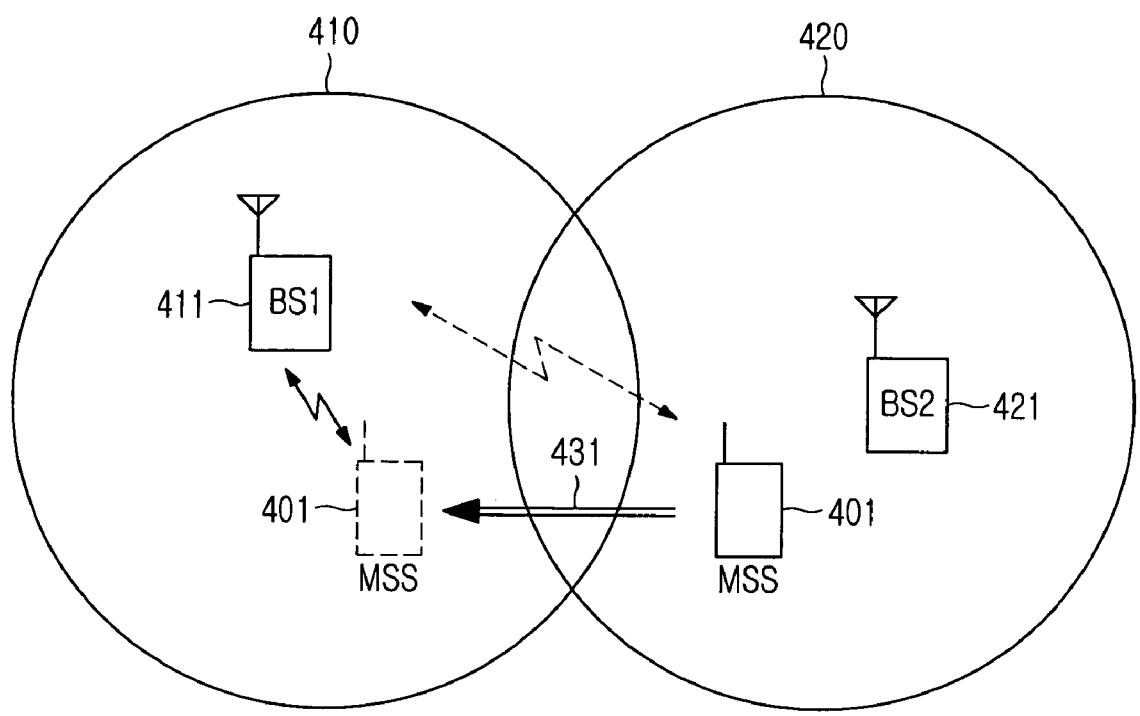

Second, a description of the second case will be made below. FIG. 4E illustrates the second case in which the MSS 401 completely moves back to the coverage 410 of the serving BS (i.e., the BS1 411), in the course of performing the handover. In FIG. 4E, reference numeral 431 indicates that the MSS 401 completely moves back to the coverage 410 of the serving BS (i.e., the BS1 411). After completely moving back to the coverage 410 of the BS1 411, the MSS 401 reports the BS1 411 that the handover situation has ended. Then the BS1 411 allocates to the MSS 401 other frequencies instead of the frequencies allocated for safety channels of the neighbor BS (i.e., the BS2 421). In this way, another MSS can use the safety channels of the BS2 421 during handover. In the first embodiment, the BS1 411 should inform the BS2 421 of the completion of handover. Thereafter, the BS1 411 can change the safety channel frequencies every frame.

Finally, a description of the third case in which the MSS 401 ends its call in the handover situation will be made below. In this case, the channels between the MSS 401 and the BS1 411 are released. Therefore, the channel resources allocated to the MSS 401 once again become available channel resources. In the first embodiment, because the channel resources are released, the BS1 411 should inform the BS2 421 of the end of the handover situation. Thereafter, the BS1 411 can change the safety channel frequencies every frame.

A detailed description will now be made of operations of the MSS and the BSs.

Figure 5:
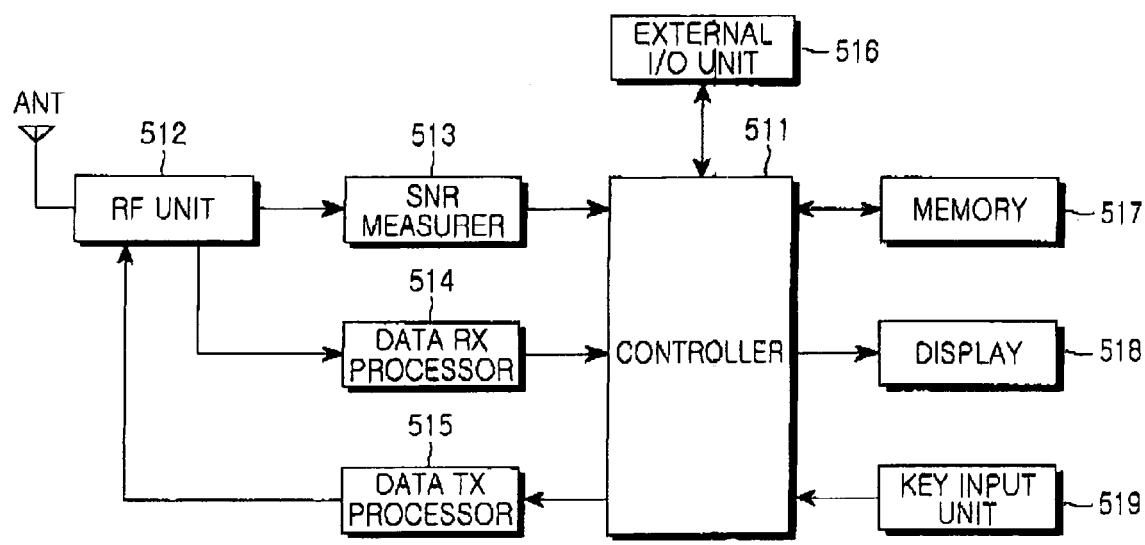
FIG. 5 is a block diagram illustrating a structure of an MSS according to an embodiment of the present invention.

FIG. 5 is a block diagram illustrating a structure of an MSS according to an embodiment of the present invention. A description will now be made of a structure and operation of an MSS according to an embodiment of the present invention.

In the MSS for an OFDMA system, a radio frequency (RF) unit 512 capable of performing data transmission/reception using an orthogonal frequency RF-processes a signal received via an antenna ANT. Here, the "RF processing" refers to an operation of up-converting a transmission signal into an RF signal and down-converting a signal received via the antenna ANT into a baseband signal. The down-converted received signal is input to an SNR measurer 513 and a data reception processor 514. The data reception processor 514 demodulates and decodes the first and second preamble signals illustrated in FIGS. 3A and 3B, and outputs the demodulation/decoding results to a controller 511. In addition, the data reception processor 514 demodulates and decodes data received through a data transmission interval 214 for the downlink 211, and outputs the demodulation/decoding results to the controller 511. The RF unit 512 outputs signals received through the second preamble signals illustrated in FIGS. 3A and 3B, to the SNR measurer 513. Then the SNR measurer 513 measures an SNR of the received signal, and outputs the measurement result to the controller 511. A description will now be made of the signal measured in the SNR measurer 513.

The MSS measures an SNR of a signal received through the transmission interval 213 for the second preamble. The SNR measurement will be described below. The MSS receives both a signal from a current serving BS and a signal from a neighbor BS. Because the serving BS and the neighbor BS use the same frequency resources in all frequency bands, if data is transmitted through the transmission interval 213 for the second preamble, a measured SNR of the data will be low. That is, due to high interference, a signal input to the SNR measurer 513 has a very high-interference signal. However, the positions where safety channel frequencies will be allocated in the next frame in the neighbor BS are punctured from the transmission interval 213 for the second preamble according to the present invention. That is, there is no signal transmitted with frequency indexes set for safety channels. Specifically, when the BS1 411 serves as a serving BS of the MSS 401 and the BS2 421 serves as a target BS of the MSS 401, signals with frequency indexes set for the safety channel frequencies in the BS2 421 among the second preamble signals from the UE1 411 are received at the MSS 401 in a very high level. This is because the BS2 421 does not transmit a preamble in the region set with the safety channel frequencies for the second preamble. Therefore, the MSS 401 detects safety channels for the target BS, and requests the BS1 411 to perform communication through the channels because of a handoff situation. Therefore, the MSS 401 located in the BS1 411 continues to communicate with the BS1 411 through the safety channel frequencies for the BS2 421 until the handover is ended. The first embodiment and the second embodiment are equal to each other in terms of the foregoing operation, except that the first embodiment changes the safety channel frequencies every a predetermined number of frames while the second embodiment always has the fixed safety channel frequency resources. That is, in the first embodiment, after the handover situation is ended, the BS1 411 and the BS2 421 change again the safety channel frequencies. Therefore, the measurement results on the safety channel frequency resources will have a high SNR. The frequency resources having a high SNR become frequency indexes used as safety channel frequency resources which are used in the next frame or fixedly used in the neighbor BS. The SNR measurer 513 outputs the measured SNR values to the controller 511. The SNR measurer 513, under the control of the controller 511, measures a level of a signal received from the serving BS and levels of signals received from neighbor BSs (i.e., BSs included in an active BS set of the MSS), and outputs the measured levels to the controller 511.

A data transmission processor 515 of the MSS encodes and modulates transmission data, and outputs the encoding/modulation results to the RF unit 512 to transmit the transmission data to a BS through an uplink. In addition, the data transmission processor 515 encodes and modulates a safety channel frequency request message and transmits the safety channel frequency request message in order to receive safety channel frequency resources allocated by the target BS during handover according to the present invention. The safety channel frequency request message will be described later.

The controller 511 controls the overall operation of the MSS, and determines whether handover is needed depending on the measurement values from the SNR measurer 513 according to the present invention. When handover is needed, the controller 511 detects safety channel frequencies for the target BS during handover. Further, for reservation on the detected safety channel frequencies for the target BS, the controller 511 generates a safety channel frequency request message to be transmitted to the serving BS and outputs the safety channel frequency request message to the data transmission processor 515. In addition, the controller 511 performs various controls for data communication, and a description thereof will be omitted for conciseness.

An external input/output unit 516 of the MSS is an input/output interface for connecting the MSS to another MSS. A memory 517 is a medium for storing control data according to the present invention, other control data needed in the MSS, user data and other data as required. A display 518 is a device for displaying operating states of the MSS, and can be implemented with a Liquid Crystal Display (LCD) or other suitable display device. A key input unit 519 is a device for generating a key signal for a key input by the user.

Figure 6:
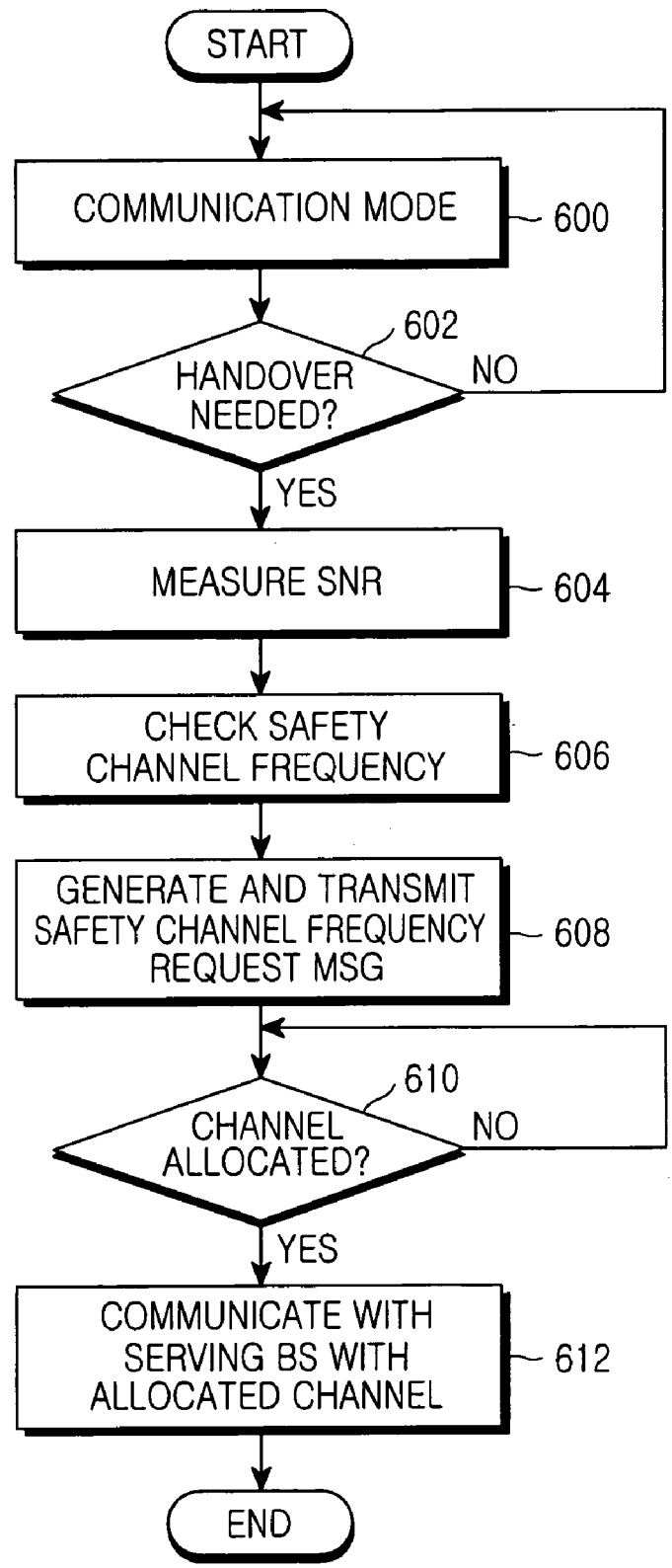
FIG. 6 is a flowchart illustrating a handover operation performed in an MSS according to an embodiment of the present invention.

FIG. 6 is a flowchart illustrating a handover operation performed in an MSS according to the first embodiment of the present invention. A detailed description will now be made of a handover operation performed in an MSS according to the first embodiment of the present invention. In step 600, the controller 511 of the MSS performs a communication mode. Here, the "communication mode" refers to a process of receiving downlink data and transmitting uplink data according to an OFDMA scheme (i.e., a process of transmitting/receiving data with the frame structure illustrated in FIGS. 3A and 3B). While performing the communication mode, the controller 511 determines in step 602 whether handover is needed. The controller 511 determines that handover is needed, if a level of a signal received from a serving BS is equal to or lower than a predetermined threshold and/or if a level of a signal received from a neighbor BS becomes greater than a level of a signal received from the serving BS. As a result of the determination, if handover is needed, the controller 511 proceeds to step 604 where it controls the SNR measurer 513 to measure an SNR of a signal received in the transmission interval 213 for the second preamble illustrated in FIGS. 3A and 3B. Thereafter, in step 606, the controller 511 checks safety channel frequencies for a target BS among neighbor BSs using the SNR measured by the SNR measurer 513.

The controller 511 can check safety channel frequency indexes in the method described with reference to FIG. 5.

After checking the safety channel frequency indexes, the controller 511 proceeds to step 608 where it generates a safety channel frequency request message for requesting allocation of the safety channel frequencies, and outputs the safety channel frequency request message to the data transmission processor 515 to transmit the safety channel frequency request message through an uplink. That is, the controller 511 encodes and modulates the generated message by controlling the data transmission processor 515 and transmits the modulated message through the RF unit 512.

Thereafter, in step 610, the controller 511 determines whether a channel allocation message is received from the serving BS with which the MSS is currently exchanging data. If it is determined that a channel allocation message is received, the controller 511 proceeds to step 612 where it performs data transmission with the allocated channel. That is, the serving BS allocates safety channel frequency resources for the target BS as frequency resources available for the MSS. Accordingly, the MSS continues to communicate with the serving BS using the safety channel frequency resources for the target BS. In this method, the MSS can safely perform handover without causing interference to another MSS in a neighbor BS.

A further description will now be made of the cases where the handover is ended (i.e., the 3 cases described above). The controller 511 of the MSS generates a handover end message and transmits the handover end message to the serving BS, when the MSS has completely moved to the coverage of the target BS. That is, the controller 511 generates a handover end message and outputs the handover end message to the data transmission processor 515. Further, the controller 511 performs an operation of controlling an encoding and modulation process for uplink transmission by controlling the data transmission processor 515, and performs a control operation of transmitting uplink data through the corresponding frequency resources by controlling the RF unit 512. Thereafter, the MSS performs data communication using the channel resources allocated from the target BS.

Also, in the case where the MSS enters back to the serving BS during handover, the controller 511 of the MSS transmits a handover end message in the foregoing manner. The only difference between this case and the other cases is in that the MSS performs data communication using the channel resources allocated gain by the serving BS.

Finally, in the case where the call is ended, the controller 511 of the MSS generates a call end message and performs corresponding processing process.

Figure 7A:
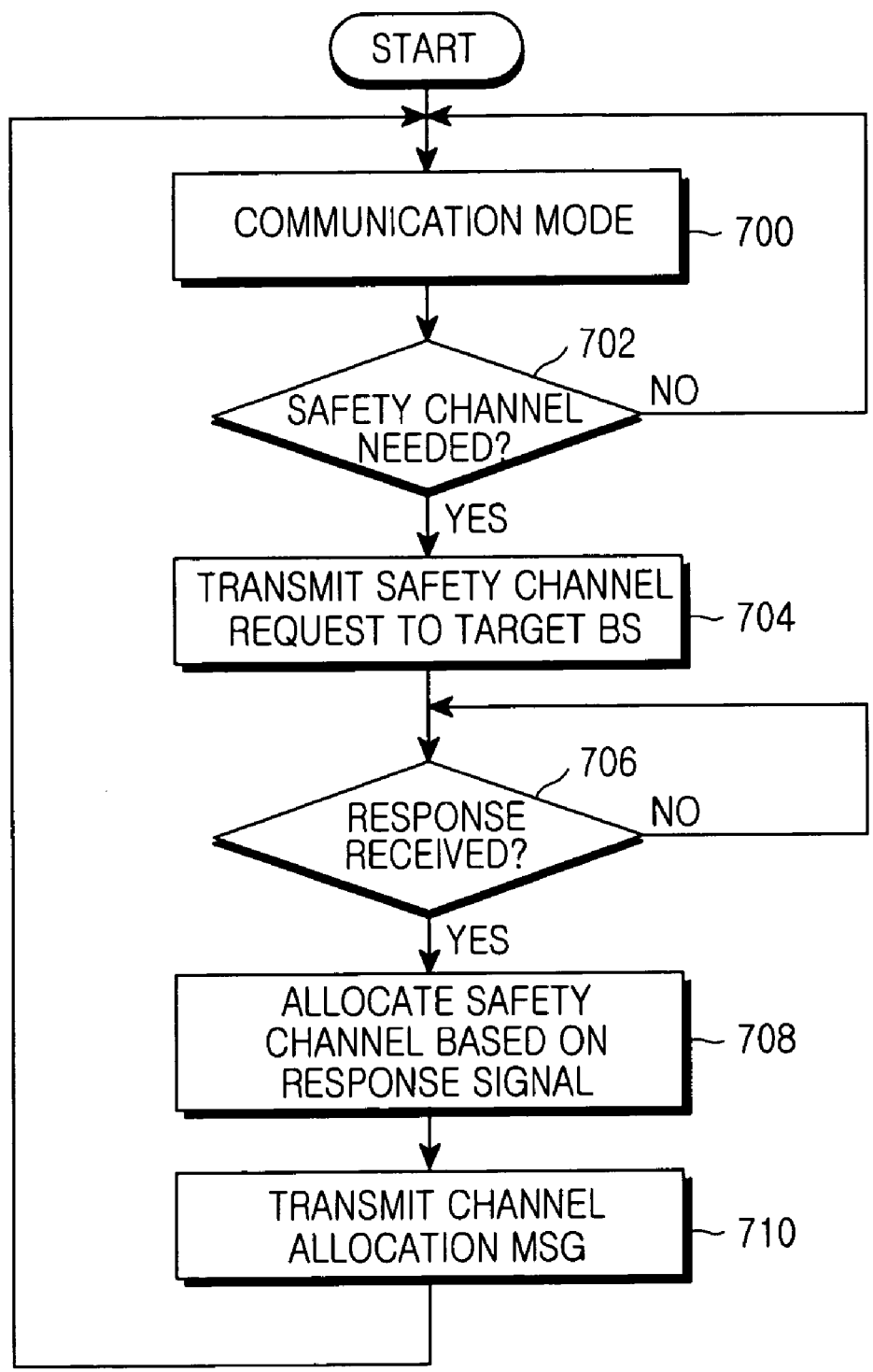
FIG. 7A is a flowchart illustrating a handover operation performed by a BS in an OFDMA system according to the first embodiment of the present invention.

FIG. 7A is a flowchart illustrating a handover operation performed in a BS according to the first embodiment of the present invention. A detailed description will now be made of a handover operation performed in a BS according to the first embodiment of the present invention.

The BS performs a communication mode in step 700. Here, the "communication mode" refers to a process of transmitting data to MSSs trough a downlink and receiving data from the MSSs through an uplink, the downlink and uplink being illustrated in FIGS. 3A and 3B. While performing the communication mode with the MSSs, the BS determines in step 702 whether a safety channel frequency request message is received from a particular MSS. That is, the BS determines whether the safety channel frequency request message transmitted in the step 608 of FIG. 6 is received through the uplink. If it is determined in step 702 that a safety channel frequency request message is received from any one of the MSSs, the BS proceeds to step 704 where it transmits the safety channel frequency request message to a target BS. That is, the MSS requests the target BS to allocate result values determined as safety channel frequencies for the target BS, as channel resources to be used during handover to the corresponding BS.

After transmitting the channel resource allocation request, the BS determines in step 706 whether a response to the safety channel frequency resource allocation request is received from the target BS. If it is determined that a response signal is received, the BS proceeds to step 708 where it allocates channel resources to be allocated to the MSS in handover operation in the next frame, based on the response signal. That is, the BS determines channel resources to be allocated to the MSS in handover operation in the next frame based on the response signal. After allocating channel resources to be used in the next frame by the MSS in handover operation, the BS proceeds to step 710 where it allocates channels with the frequency resources requested by the MSS, generates a channel allocation message for the allocated channels, and transmits the channel allocation message to the MSS in handover operation. In this method, the BS allows the MSS to use channel resources allocated by the target BS as safety channel frequency resources during handover.

In the process illustrated in FIG. 7A, the BS transmits a safety channel request to the target BS, generates a safety channel allocation message upon receiving a response signal to the safety channel request, and transmits the safety channel allocation message to the MSS. That is, it is assumed that the control process is performed in order of step 704, step 706, step 708 and step 710. Alternatively, however, the control process can be performed in such a manner that the BS, which is a serving BS, first allocates requested channel resources based on information received from the MSS, generates a message for requesting allocation of the same BS resources as the allocated channel resources, and transmits the message to the target BS. That is, the steps 704 and 706 can be performed after the steps 708 and 710.

The case where handover is ended will be made with reference to FIG. 7B, and can be equally applied to both the first and second embodiments of FIG. 7A.

Figure 7B:
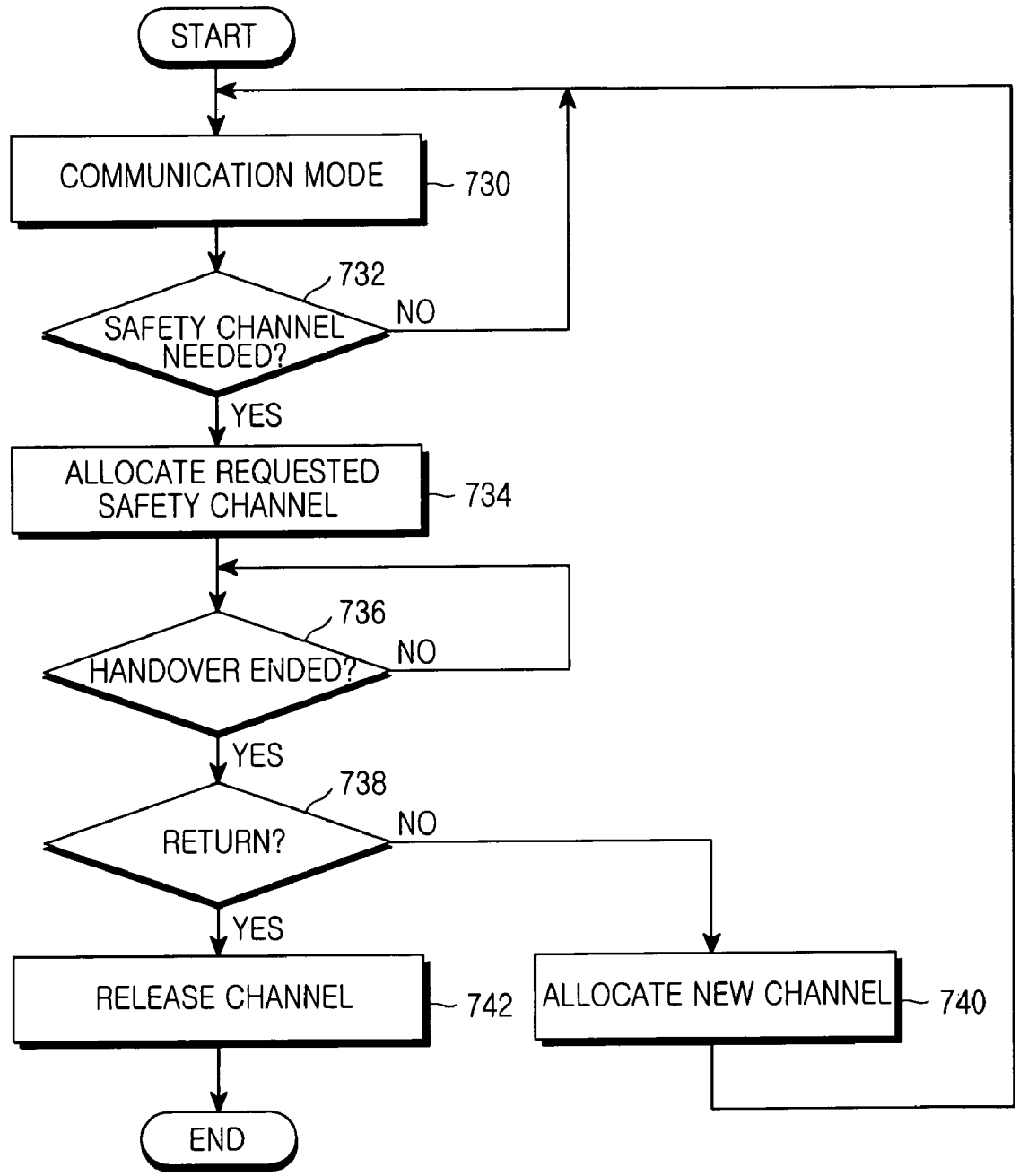
FIG. 7B is a flowchart illustrating a handover operation performed by a BS in an OFDMA system according to the second embodiment of the present invention.

FIG. 7B is a flowchart illustrating a handover operation performed by a BS in an OFDMA system according to the second embodiment of the present invention. With reference to FIG. 7B, a detailed description will now be made of a handover operation performed by a BS in an OFDMA system according to the second embodiment of the present invention.

The BS performs a communication mode in step 730. Here, the "communication mode" refers to a process of transmitting data to MSSs trough a downlink and receiving data from the MSSs through an uplink (the downlink and uplink were illustrated in FIGS. 3A and 3B). While performing the communication mode with the MSSs, the BS determines in step 732 whether a safety channel frequency request message is received from a particular MSS. That is, the BS determines whether the safety channel frequency request message transmitted in the step 608 of FIG. 6 is received through the uplink. If it is determined in step 732 that a safety channel frequency request message is received from any one of the MSSs, the BS proceeds to step 734 where it transmits the safety channel frequency request message to a target BS. That is, the MSS requests the target BS to allocate result values determined as safety channel frequencies for the target BS, as channel resources to be used during handover to the corresponding BS.

Thereafter, the BS determines in step 736 whether handover of the MSS is ended. If it is determined in step 736 that handover of the MSS is ended, the BS proceeds to step 738. In step 738, the BS determines a type of the handover end. That is, the BS determines to which of the foregoing 3 cases the handover end corresponds. If it is determined that the handover end has happened due to the MSS's return to a serving BS, the BS proceeds to step 740. Otherwise, the BS proceeds to step 742 where it releases channels. In the first embodiment, the BS should inform the target BS of the handover end. However, in the second embodiment, the BS is not required to inform the target BS of the handover end.

If the MSS re-enters the serving BS which is its original BS (i.e., if the BS proceeds to step 740), the BS allocates other channels except the safety channel resources for the target BS, which is a unique process performed in the second embodiment. However, in the first embodiment, the BS should inform the target BS of the handover end.

Figure 8:
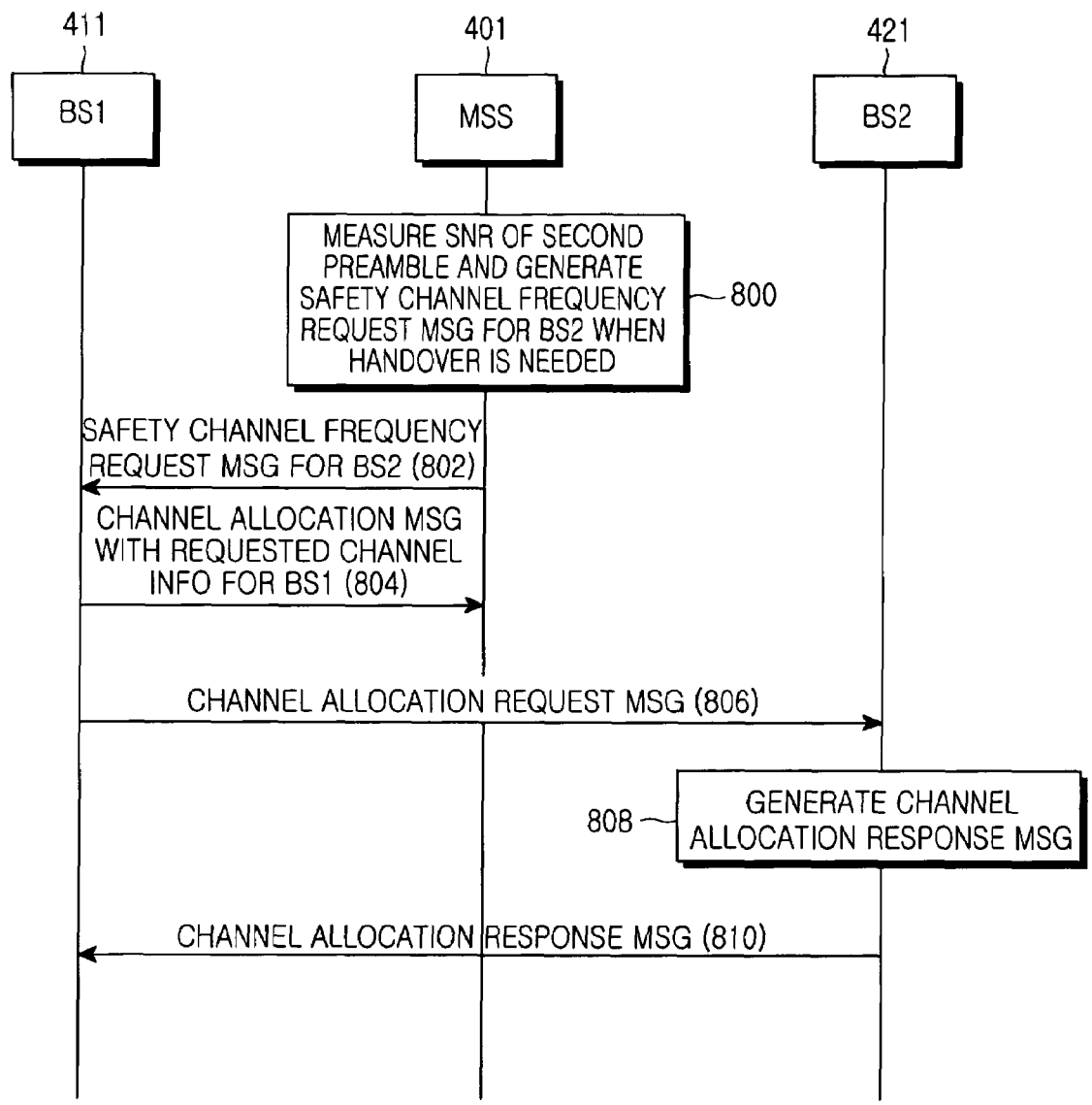
FIG. 8 is a flow diagram illustrating a procedure for allocating channels to an MSS in handover operation in an OFDMA system according to an embodiment of the present invention.

A description of the foregoing operations will now be made from a standpoint of the system. FIG. 8 is a signaling diagram illustrating a procedure for allocating channels to an MSS in handover operation in an OFDMA system according to the first embodiment of the present invention. With reference to FIG. 8, a description will now be made of a procedure for allocating channels to an MSS in handover operation in an OFDMA system according to the first embodiment of the present invention. It will be assumed in FIG. 8 that the BS1 411 and the BS2 421 illustrated in FIGS. 4A to 4E serve as a serving BS and a target BS, respectively.

While performing communication with a BS1 411 which is a serving BS, an MSS 401 checks determines in step 800 whether handover is needed. If handover is needed, the MSS 401 measures an SNR in a transmission interval 213 for a second preamble. The MSS 401 generates a safety channel frequency request message for a target BS (i.e., the BS2 421), based on the measured SNR. After generating the safety channel frequency request message, the MSS 401 proceeds to step 802 where it transmits the safety channel frequency request message for the target BS to the BS1 411. In response, the BS1 411 allocates in step 804 the same channel frequency resources as the requested channel frequencies to the MSS 401 that has transmitted the safety channel frequency request message. In this way, the MSS 401 is allocated the frequency resources to use in the next frame.

The signaling diagram of FIG. 8 is designed in the opposite order of the BS's operation described with reference to FIG. 7A. That is, the BS1 411 is designed to perform steps 704 and 706 after performing steps 708 and 710. However, it is preferable for the BS1 411 to perform its operation in the method of FIG. 7A. After transmitting the channel allocation message to the MSS 401, the BS1 411 proceeds to step 806 where it generates a channel allocation request message for requesting allocation of the same channel resources as the channels requested by the MSS 401 to the MSS 401, and transmits the channel allocation request message to the BS2 421 which is the target BS. In step 806, the BS2 421 determines whether the requested channels are available, and generates a channel allocation response message according to the determination result. In step 810, the BS2 421 transmits the channel allocation response message to the BS1 411.

In this manner, it is possible to provide stable handover to an MSS moving from a serving BS to a target BS, and prevent interference to another MSS located in the target BS.

Matching the signaling diagram of FIG. 8 to the procedure of FIG. 7A, the BS1 411 should perform step 806 after step 802 is performed, and in steps 808 and 810, the BS1 411 performs a process of determining channels to be allocated to the MSS in handover operation according thereto. The BS1 411 transmits the channel allocation message including the determined channel information to the MSS 401.

According to the second embodiment, the step 806 for transmitting the channel allocation request message and the steps 808 and 810 for determining whether there are available channels are not required. This is because the second embodiment always uses the fixed safety channel frequency resources except for the special case where two different BSs are equal in terms of their safety channel frequencies. In FIG. 8, a handover end situation has not been described separately, because it is equal to the handover end situation described above.

As can be understood from the foregoing description, the application of the present invention enables seamless communication during handover in an OFDMA system, using a frequency reuse factor approximating 1 as close as possible.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of allocating frequency for handover of a Subscriber Station (SS) for use of a frequency reuse factor of 1 or a frequency reuse factor approximating 1 in a communication system, the method comprising:

receiving, by the SS, a frame in a first coverage of a serving Base Station (BS);

detecting, by the SS, frequencies in the frame, when the SS is located in the first coverage and a second coverage of a target BS, and reporting to the serving BS the detected frequencies; and receiving a signal representing that the detected frequencies are determined safety channel frequencies used between the target BS and the SS;

wherein the SS uses the detected frequencies together with the target BS, the target BS receives the safety channel frequencies, the target BS determines that the SS communicates data with the target BS using the safety channel frequencies until the handover ends, and the target BS varies the safety channel frequencies every predetermined number of frames, wherein the frame includes a preamble including a first preamble and a second preamble, the first preamble is used for transmitting, by the SS, information to measure a distance from the serving BS and a state of a channel between the SS and the serving BS, and the second preamble is used for transmitting, by the SS, data in frequencies except for the detected frequencies, in which data is not transmitted among frequencies included in the second preamble of the frame.

2. The method of claim 1, wherein the detected frequencies are frequencies in which data is not transmitted among frequencies included in the second preamble of the frame, the frequencies in which data is not transmitted are determined according to a pattern, and the pattern is set differently for every BS, and is changed every frame.

3. A method of allocating frequency for handover of a Subscriber Station (SS) for use of a frequency reuse factor of 1 or a frequency reuse factor approximating 1 in a communication system, the method comprising:

allocating, by a serving Base Station (BS), frequencies not used in neighbor BSs as safety channel frequencies in a next frame, the safety channel frequencies being used by the serving BS and the SS; and communicating with the serving BS, by the SS, the safety channel frequencies until the handover ends, wherein when the SS completely moves to a coverage of the target BS, the SS releases a call with the serving BS and communicates with only the target BS using other frequencies instead of the safety channel frequencies, and wherein when the SS completely moves back to a coverage of the serving BS while performing the handover, the SS reports, to the serving BS, that a handover situation has ended, and the serving BS allocates to the SS other frequencies instead of the safety channel frequencies, and wherein when the SS ends the call while performing the handover, the serving BS releases allocation of the safety channel frequencies, reports the end of the handover to the target BS and changes the safety channel frequencies every frame, and wherein the frame includes a preamble including a first preamble and a second preamble, the first preamble is used for transmitting, by the SS, information to measure a distance from the serving BS and a state of a channel between the SS and the serving BS, and the second preamble is used for transmitting, by the SS, data in frequencies except for the detected frequencies, in which data is not transmitted among frequencies included in the second preamble of the frame.

4. The method of claim 3, wherein the detected frequencies are frequencies in which data is not transmitted among frequencies included in the second preamble of a frame, the frame is received by the SS in a coverage of the serving BS, and the frequencies in which data is not transmitted are determined according to a pattern that is set differently for every BS, and is changed every frame.

* * * * *